United States Patent [19]
Kroeger et al.

[11] Patent Number: 5,566,214
[45] Date of Patent: Oct. 15, 1996

[54] AUTOMATIC NOISE NORMALIZATION AND REACQUISITION CONTROL FOR A QPSK DEMODULATOR SYMBOL TRACKING LOOP

[75] Inventors: Brian W. Kroeger, Sykesville; Jeffrey S. Baird, Laurel, both of Md.

[73] Assignee: Westinghouse Electric Company, Pittsburgh, Pa.

[21] Appl. No.: 491,667

[22] Filed: Jun. 19, 1995

[51] Int. Cl.$^6$ ........................................... H04L 7/00
[52] U.S. Cl. .......................... 375/355; 375/344; 375/345
[58] Field of Search ................................ 375/354, 355, 375/359, 344, 345, 346, 350, 324, 326, 371, 373, 376; 327/155, 161, 141; 348/536; 455/192.1, 192.2, 232.1, 234.1, 234.2; 329/304, 305, 307, 310; 370/105.3

[56] References Cited

U.S. PATENT DOCUMENTS

| | | | |
|---|---|---|---|
| 4,472,817 | 9/1984 | Poklemba et al. | 375/344 |
| 4,724,486 | 2/1988 | Tonge et al. | 348/489 |
| 5,307,165 | 4/1994 | Kawashima et al. | 348/558 |
| 5,440,587 | 8/1995 | Ishikawa et al. | 375/344 |

OTHER PUBLICATIONS

"Telecommunication Systems Engineering" by William C. Lindsey et al, pp. 428–435, Prentice–Hall, Inc., New Jersey 1973.

*Primary Examiner*—Wellington Chin
*Assistant Examiner*—Huong Luu

[57] ABSTRACT

A QPSK demodulator symbol tracking loop including automatic noise normalization and reacquisition control enables improved symbol tracking and acquisition during fading or intermittent channel conditions. A noise variance estimate is determined and the symbol tracking loop flywheels when the signal level dips below a flywheel threshold relative to the noise variance estimate during fading or intermittent channel conditions. Determination in advance of an absolute power level of the thermal noise floor of analog front end components is dispensed with and precise control of the gain and noise level of the analog front end components is not needed, thus simplifying design. A reacquisition mode is declared upon determination of an abrupt increase in signal level indicative of emergence from a fading condition or upon detection of an excessive symbol tracking error signal. During the reacquisition mode, the loop gain of the symbol tracking loop is temporarily increased to improve reacquisition time.

25 Claims, 6 Drawing Sheets

AUTOMATIC NOISE NORMALIZATION AND REACQUISITION CONTROL FOR A QPSK DEMODULATOR SYMBOL TRACKING LOOP

CROSS REFERENCE TO RELATED APPLICATIONS

This application is related to copending application U.S. Ser. No.: 08/322,847 filed by Brian W. Kroeger, Jeffrey S. Baird and Joseph B. Bronder on Oct. 13, 1994 entitled "Carrier Tracking Loop for QPSK Demodulator" and U.S. Ser. No.: 08/322,854 filed by Brian W. Kroeger, Joseph B. Bronder, Tod A. Oblak and Jeffrey S. Baird on Oct. 13, 1994 entitled "Symbol Synchronizer Using Modified Early/Punctual/Late Gate Technique".

BACKGROUND OF THE INVENTION

1. Field of the Invention

The present invention relates to automatic noise normalization and symbol tracking techniques which can be used to enhance the performance of a symbol tracking loop in a QPSK or $\pi/4$ QPSK digital demodulator.

2. Description of the Background Art

QPSK demodulator symbol tracking loops are generally known. Moreover, the symbol tracking loop of copending application U.S. Ser. No. 08/322,847 includes an error signal normalization feature for extending the dynamic range of the input signal. The demodulator symbol tracking loop of this copending application further includes a fading mitigation feature in which a constant term related to a representation of the absolute power level of the thermal noise floor of the front end components is added to the error signal during normalization to permit the symbol tracking loop to flywheel at a flywheel threshold when the input signal level is unacceptably low. The flywheel threshold is determined based upon the above-noted constant. Accordingly, the fading mitigation feature of the copending application requires that the absolute power level of the thermal noise floor be known in advance. The front end components of the demodulator of the copending application thus must operate with a known or unvarying gain or noise level.

A typical conventional approach includes the implementation of automatic gain control in the front end components to compensate for gain variation. However, automatic gain control undesirably fixes the signal plus noise level, not the noise level itself. The absolute power level of the thermal noise floor therefore cannot be accurately determined and maintained in this typical conventional approach.

SUMMARY OF THE INVENTION

An object of the present invention is to provide a symbol tracking loop having automatic noise normalization so that precise control of gain variations and noise level of analog front end components is not required.

A further object of the present invention is to provide a low cost symbol tracking loop of simplified design having automatic noise normalization which can tolerate signal fades and intermittent channel conditions.

A still further object of the present invention is to provide a symbol tracking loop having improved reacquisition control which reduces reacquisition time.

An additional further object of the present invention is to provide a symbol tracking loop having improved reacquisition control which can tolerate signal fades while improving performance.

The above-noted and other objects of the present invention are fulfilled by providing a symbol tracking loop having a symbol synchronizer for sampling a modulated symbol waveform having varying signal level at an optimum sampling timing in accordance with an error signal and for outputting symbol samples; a noise estimator for determining a noise variance estimate of the symbol samples and for generating a noise variance signal indicative of the noise variance estimate; and a synchronization estimator for determining if a sampling timing of the symbol synchronizer coincides with a symbol timing of the modulated symbol waveform based on the symbol samples and for generating the error signal indicative thereof. The symbol synchronizer adjusts the sampling timing in accordance with the error signal. The synchronization estimator is coupled to the noise estimator to receive the noise variance signal and sets the error signal to a flywheel threshold relative to the noise variance estimate such that the symbol tracking loop flywheels when the signal level of the modulated symbol waveform falls below the flywheel threshold.

The above-noted and other objects of the present invention can also be filled by a method of symbol tracking including (a) sampling a modulated symbol waveform at a sampling timing in accordance with an error signal to provide symbol samples, the modulated symbol waveform having a varying signal level; (b) determining a noise variance estimate of the symbol samples and generating a noise variance signal indicative of the noise variance estimate; and (c) determining if the sampling timing in step (a) coincides with a symbol timing of the modulated symbol waveform based on the symbol samples and generating the error signal indicative thereof, the sampling timing of step (a) being adjusted in accordance with the error signal. Step (c) includes setting the error signal to a flywheel threshold relative to the noise variance estimate such that the symbol tracking flywheels when the signal level of the modulated symbol waveform falls below the flywheel threshold.

The above-noted objects of the present invention are also fulfilled by providing a symbol tracking loop including a symbol synchronizer for sampling a modulated symbol waveformhaving varying signal level at an optimum sampling timing in accordance with an error signal and for outputting symbol samples; a synchronization estimator for determining if a sampling timing of the symbol synchronizer coincides with a symbol timing of the modulated symbol waveformbased on the symbol samples and for generating the error signal indicative thereof, wherein the symbol synchronizer adjusts the sampling timing in accordance with the error signal; a level detector for determining an average signal level of the symbol samples and for outputting an average level signal indicative thereof; a delay for delaying the average level signal by a predetermined number of symbol periods and for outputting a delayed level signal; a reacquisition determinator for comparing the delayed level signal and the average level signal and for outputting a reacquisition signal if the average level signal is greater than twice the delayed level signal; and a gain controller for increasing a gain of the symbol tracking loop upon receipt of the reacquisition signal.

The above-noted objects of the present invention are also fulfilled by a method of symbol tracking including (a) sampling a modulated waveform at a sampling timing in accordance with an error signal to provide symbol samples, the modulated symbol waveform having a varying signal level; (b) determining if a sampling timing in step (a) coincides with a symbol timing of the modulated symbol waveform based on the symbol samples and generating the error signal indicative thereof, the sampling timing of step (a) being adjusted in accordance with the error signal; (c) determining an average signal level of the symbol samples to provide an average level signal indicative thereof; (d) delaying the average level signal by a predetermined number of symbol periods to provide a delayed level signal; (e) comparing the delayed level signal and the average level signal and providing a reacquisition signal if the average level signal is greater than twice the delayed level signal; and (f) increasing a symbol tracking gain upon provision of the reacquisition signal.

The above-noted symbol tracking loop can be used in a mobile satellite mobile terminal receiver, for example. The symbol waveform may be QPSK or $\pi/4$QPSK modulated.

Further scope and applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
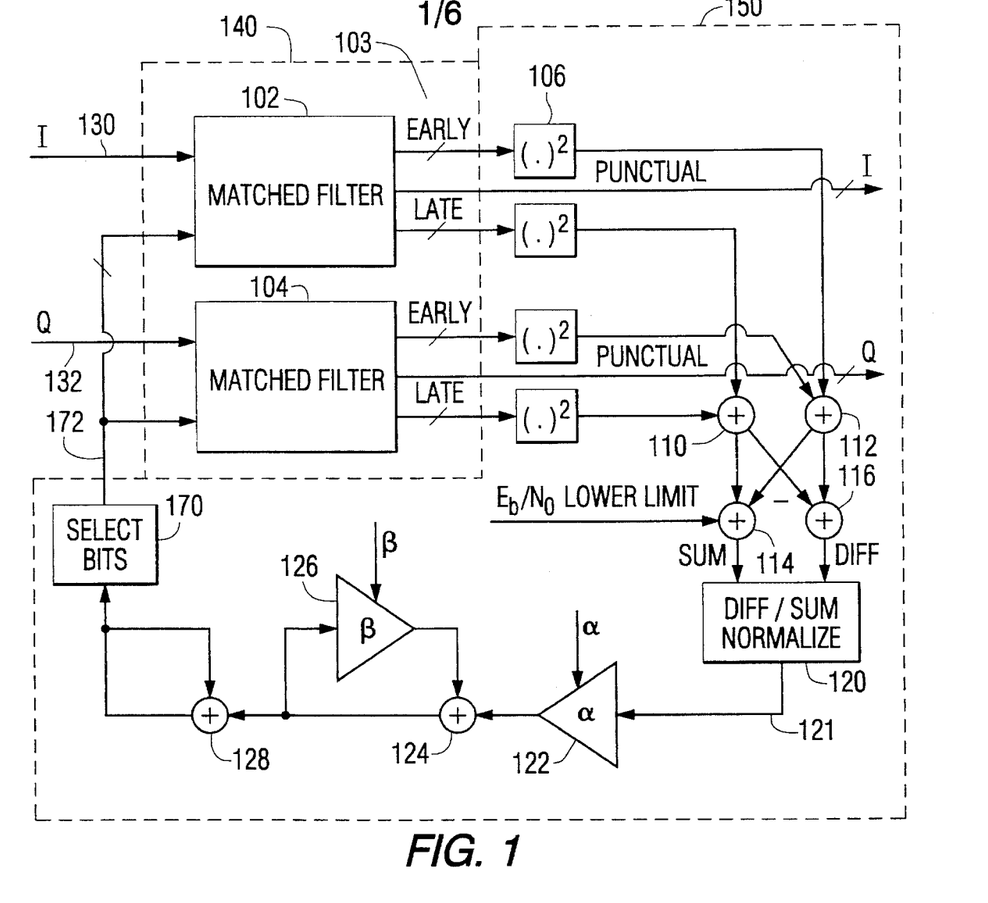
FIG. 1 is a schematic block diagram of a demodulator symbol tracking loop disclosed in the above-noted copending application.

FIG. 1 is a schematic block diagram of a demodulator symbol tracking loop, including matched filter pair/symbol synchronizer 140 and symbol synchronization estimator 150, which converts a digitally modulated analog waveform into a digital data sequence. The digitally-modulated sampled waveform is converted into a sequence of samples representing the matched filter outputs at the optimum (or nearly optimum) symbol sample times. The near baseband input data waveform of the symbol tracking loop illustrated in FIG. 1 may consist of filtered complex pulses having complex (real and imaginary) polarities which represent the data stream. The complex pulses may be Nyquist filtered for optimal performance in noise. This embodiment is disclosed in copending application U.S. Ser. No. 08/322,847 filed on Oct. 13, 1994. It is to be understood that the symbol tracking loop of this embodiment is not limited to the particular system described hereinafter. For example, the symbol tracking loop of FIG. 1 may be used in various receiver types such as mobile satellite terminal receivers and in modems.

The synchronization technique of FIG. 1 utilizes a pair of matched filter outputs per symbol (i.e. early and late filters) to assess and adjust the symbol timing. The early-late gate configuration is motivated by a Maximum A Posteriori (MAP) approach with approximations under particular ideal conditions. The early-late gate synchronizer works on the principle that the average square or absolute value of the matched filter output becomes greater as the timing approaches the optimal point, or where the center of the symbol coincides with the center of the matched filter. Although either the early or late matched filter outputs can be used for normal detection, the largest output is generally used. When the spacing between the early and late matched filter outputs is close, an additional punctual output is computed as the normal output for symbol detection, yielding better performance. The early and late outputs are used to determine how the symbol synchronization timing is adjusted. When the symbol timing is correct, the average absolute value of the early and late outputs should be equal, while the punctual output, if present, should be greater than the early and late outputs. When an imbalance in the early and late average absolute values is detected, then the symbol timing is adjusted in the appropriate direction using an appropriately filtered feedback mechanism.

Figure 2:
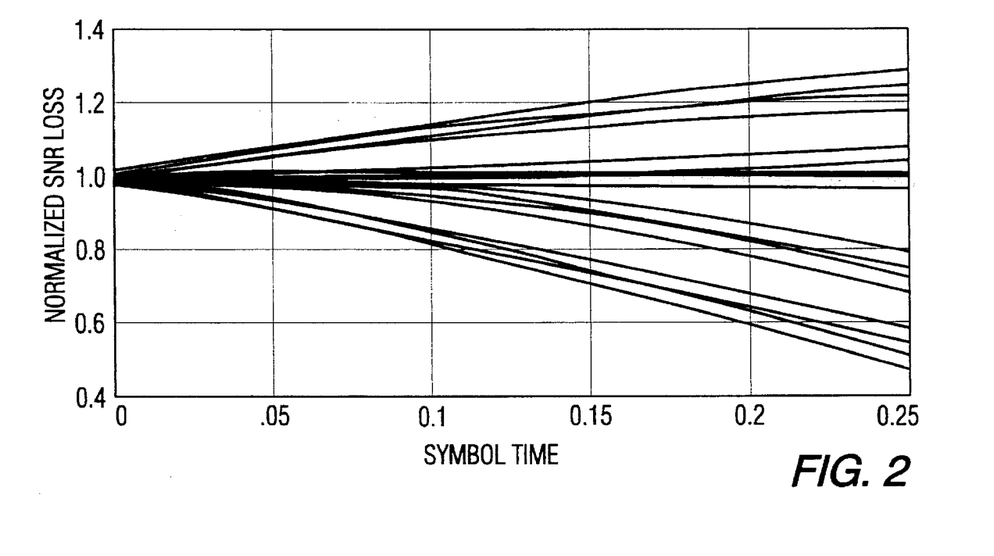
FIG. 2 illustrates an eye pattern for a 60% cosine Nyquist filtered signal (approximated by finite impulse response filter)

The values of the matched filter outputs can be examined through an eye pattern. FIG. 2 illustrates an eye pattern for a 60% cosine Nyquist filtered signal (approximated by finite impulse response filter) which has been appropriately truncated and windowed for realizability. The horizontal axis represents symbol time in fractions and the vertical axis represents sample value, the nominal value thereof being 1. Although the signal trajectory for an intersymbol interference (ISI) free signal may pass through a common point (the ideal sample instant), any timing errors, including the intentional timing offsets for the early and late gates, are subject to intersymbol interference. Therefore, any deviation from the ideal sample instant results in degradation due not only to mismatch energy loss, but primarily due to intersymbol interference.

It can be observed in FIG. 2 that a typical band limited data dependent signal trajectory through the ideal sample instant (eye pattern) and its first derivative are continuous functions of time. Examination of the effects of timing error on bit error rate (BER) shows that small timing errors have a significant effect on signal to noise ratio (SNR). The effect is significant for applications which have a tight signal to noise ratio margin, although not as significant as for other systems. As can be observed in FIG. 2, if the timing error is $1/10$ of a symbol, the signal to noise ratio loss for the worst case data pattern is approximately 1.9 dB. Unfortunately, the worst case patterns tend to dominate the bit error rate performance due to the "waterfall" characteristic of the error function, which is a bit error rate performance measure. Therefore, accurate symbol synchronization is essential for minimizing equivalent signal to noise ratio loss.

Synchronizer 140 and symbol synchronization estimator 150 of FIG. 1 find an optimal symbol timing for sampling an incoming data sequence. The symbol synchronizer 140 accepts complex in-phase I and quadrature Q samples of the baseband or near baseband signal QPSK, or π/4QPSK signal for example, which may have arbitrary phase rotation and some frequency offset. The input I and Q signals 130 and 132 are input to matched filters 102 and 104 respectively, and can be expressed as:

$$r(k/f_s) \equiv \sum_{n=0}^{\infty} e^{jd_n\pi/2} p(k/f_s - nT) e^{\phi(k/f_s)} + n(k/f_s) \quad (1)$$

where d=0, 1, 2, or 3 dependent upon the data pair modulating the nth symbol, time t is replaced with sample times $k/f_s$, p(t) is the matched filter impulse response, $\phi(t)$ is a random phase process with an arbitrary mean, $f_s$ is a sample rate, and n(t) is typically a complex additive white Gaussian noise (AWGN) process with single sided power spectral density $N_0/2$.

Matched filters 102 and 104 receive from select bits element 170 interpolation control signal 172 of B-bit width, which determines an effective advance or delay of the impulse response timing of the matched filters 102 and 104 relative to the input signals 130 and 132. The range of the interpolation control is 0 to $2^B-1$ values where this range is modulo $2^B$ spanning one symbol. The most significant bits (msb's) are conveniently set to represent the input sample index n offset and the least significant bits (lsb's) are set to represent the interpolation index i. The msb's of the interpolation index may be used depending upon the resolution while the lsb's of the interpolation index are computed in the accumulation but are not truncated.

Figure 3A:
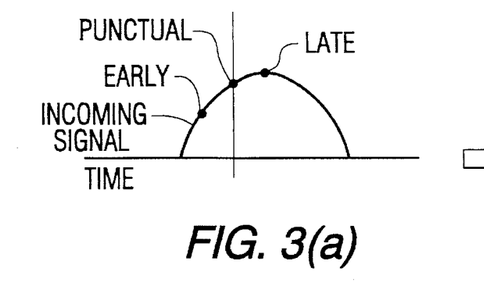
FIGS. 3(a) and 3(b) respectively illustrate an example of the timing of the matched filters of the FIG. 1 embodiment leading the timing of an incoming signal and the effect of changing to a different set of filter coefficients.
Figure 3B:
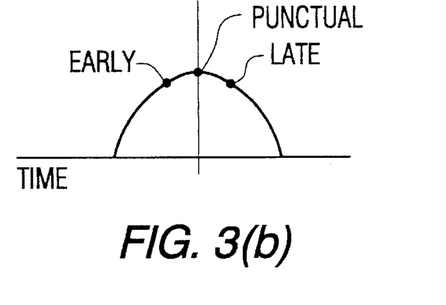
Figure 4A:
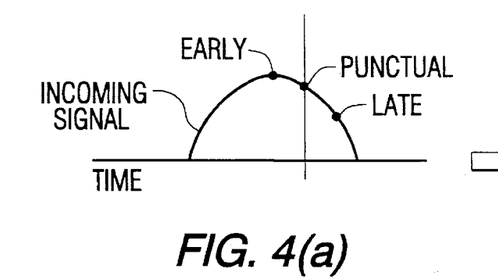
FIGS. 4(a) and 4(b) respectively illustrate an example of the timing of the matched filters of the FIG. 1 embodiment lagging the timing of an incoming symbol and the effect of changing to a different set of the filter coefficients.

FIGS. 3(a) and (b) and FIGS. 4(a) and (b) show an input to matched filters 102 and 104. In this particular embodiment, a 3-bit interpolation control signal is used, wherein B=3. It is to be understood that the system is not limited to using a 3-bit interpolation signal. Since B=3, each incoming symbol is represented by 8 sequential samples. Filters 102 and 104 each contain 8 sets of interpolation coefficients for each sample in this particular illustrative example. Thus, the range of the interpolation control signal is 0 to 7 values. In the described embodiment, select bits element 170 selects the 14th through 12th bits of a signal output from adder 128 to be the 3-bit interpolation signal input to the matched filters 102 and 104. Adder 128 functions as an integrator in this embodiment. Symbol synchronization is established when the interpolation control sets the matched filter timing coincident with the incoming symbol timing. This is accomplished through feedback control in the loop. The matched filter timing is adjusted by using one of eight sets of filter coefficients in each filter as described hereinafter. The derivation of the weighting of the filters 102 and 104 is also described below.

Figure 5:
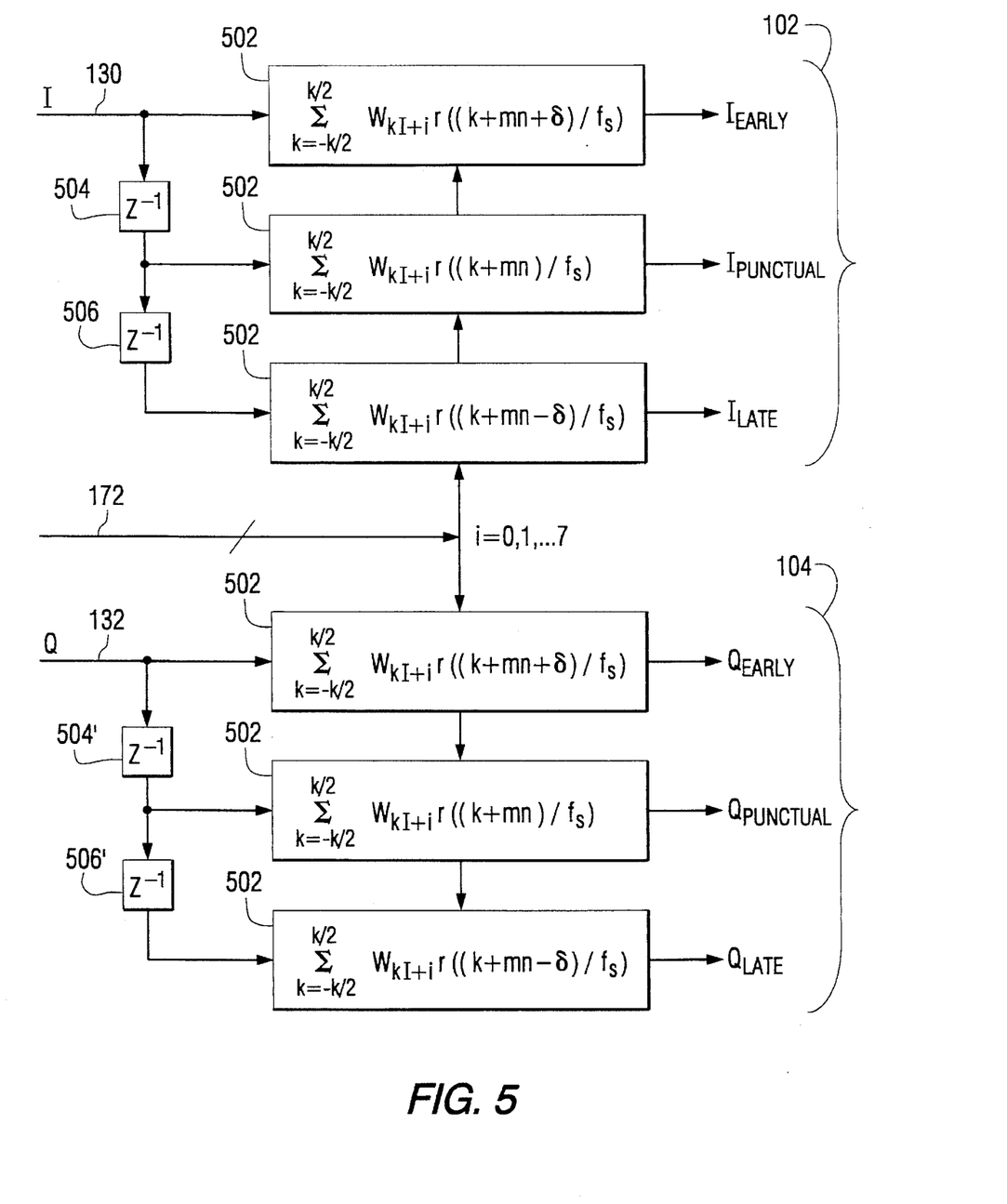
FIG. 5 illustrates the matched filters of the FIG. 1 embodiment in greater detail.

FIG. 5 illustrates the matched filters 102 and 104 in greater detail. The matched filter output signals 103 of matched filters 102 and 104 are:

$$\begin{bmatrix} h_{early}(n) \equiv \sum_{k=-k/2}^{k/2} W_{kI+i} r((k+mn+\delta)/f_s) \\ h_{punct}(n) \equiv \sum_{k=-k/2}^{k/2} W_{kI+i} r((k+mn)/f_s) \\ h_{late}(n) \equiv \sum_{k=-k/2}^{k/2} W_{kI+i} r((k+mn-\delta)/f_s) \end{bmatrix} \quad (2)$$

wherein m is the number of complex samples per symbol period (e.g., 8), $W_{kI+i}$ are the filter weights, I is the number of interpolated filter coefficients between input samples, i is the particular interpolated set as indicated by the interpolation control signal 172, $f_s$ is the sample rate, and $\delta$ is the early or late time difference, which is set to one input sample time or period in the described embodiment. In this particular embodiment, the decimated outputs 103 of the matched filter outputs each have a bit width of 10 bits. The matched filters 102 and 104 generally span several or more symbol periods to minimize intersymbol interference while approximating root-Nyquist characteristics. There are three outputs (i.e. early, punctual, and late) for each I and Q signal path. Hence, as shown in FIG. 5, there are actually six matched filters 502, wherein delay elements 504, 506, 504' and 506' delay the incoming signals 130 and 132 by one sample period δ.

The effective sample rate of the matched filter relative to the symbol rate determines the resolution of timing control over the symbol period. The effective resolution for the symbol synchronizer is (mI) virtual samples per symbol. The more sample points per symbol, the more timing resolution is improved. A key feature of this matched filter is its ability to provide very fine resolution through interpolation without increasing the sample rate. This interpolation places virtual sample points between the actual sample points. For the filter defined by equation (2), the index n sets the input sample index, while the index i sets the interpolation index. For example, if there are 8 samples per symbol ($f_sT=8$), a resolution of 64 virtual samples per symbol can be achieved by using 8 sets of matched filter coefficients (I=8), each set skewed by 1/64 of a symbol period.

Figure 4B:
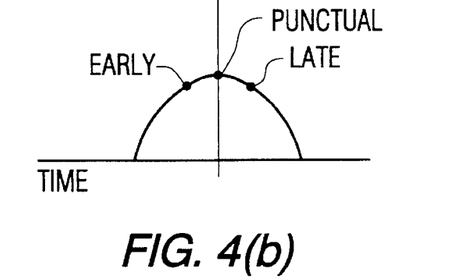

FIGS. 3(a) and 3(b) respectively show an example of the timing of the matched filters leading timing of the incoming symbol and the effect of changing to a different set of the eight sets of filter coefficients in each of the filters 502 illustrated in FIG. 5, in accordance with interpolation control signal 172. FIGS. 4(a) and 4(b) show an example of the timing of the matched filters lagging the timing of the incoming symbol and the effect of changing to a different set of the eight sets of filter coefficients in each filter 502, in accordance with interpolation control signal 172.

Figure 6:
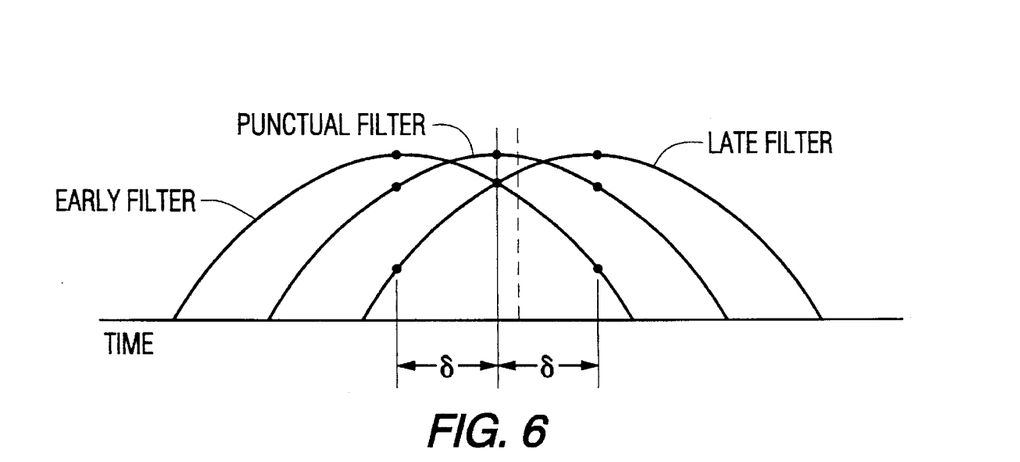
FIG. 6 illustrates the early, punctual and late filter timings of a matched filter of the FIG. 1 embodiment.

FIG. 6 shows the matched filter timing. Each of the early, punctual, and late filters 502 use 40 filter coefficients, one of eight possible sets of filter coefficients for that filter. If the punctual filter is centered on a symbol at the solid vertical line, the outputs of the early and late filter outputs are equal. If the punctual filter is not centered on a symbol, or is centered on the dotted vertical line 1/8 of a symbol period from the solid vertical center line for example, the early and late outputs are unequal.

The punctual I and Q signals output from the matched filters are information bearing signals and are passed out of the synchronizer. The early and late signals are used to adjust the timing of the filters as noted earlier. As illustrated in FIG. 1, the early and late matched filter outputs 103 are rectified in symbol synchronization estimator 150 through appropriate nonlinearity elements 106, which may be squaring elements or other non-linearities for example. The early outputs of matched filters 102 and 104 are summed in adder 112 after rectification in non-linearities 106 and the late outputs of matched filters 102 and 104 are summed in adder 110 after rectification. Next, a sum output is determined in adder 114 by adding the outputs of adders 110 and 112. A difference output is determined by subtracting the output of adder 110 from the output of adder 112 in difference element 116. The difference output provided from difference element 116 functions as an error signal and provides an indication of whether the matched filter timing is ahead or behind the incoming symbol timing.

The difference signal output from difference element 116 is a function of the square of the input signal level. It follows therefore that the loop gain is very sensitive to the input signal level. The first order gain parameter $\beta$ and the second-order integration parameter $\beta$ set the acquisition time and the tracking bandwidth of the closed loop. These parameters change dramatically with varying input signal level. Adder 128 which functions as a second integrating element beneficially decreases acquisition time while minimizing tracking (noise) bandwidth. It is noted however that without a signal level control scheme, these parameters would establish the acquisition time and loop bandwidth valid only for one fixed input signal level.

The subsequently described normalization is a signal level control scheme which enables valid use of a particular acquisition time parameter $\alpha$ and tracking bandwidth parameter $\beta$ for more than one fixed input signal level. The dynamic range of the input signal can be extended indefinitely by normalization. Normalization is achieved in element 120 by dividing the difference output from difference element 116 by the sum output from adder 114 to provide normalized error signal 121. The error signal 121 is subsequently provided to amplifier 122 which sets acquisition time through the gain parameter $\alpha$. Thereafter, the error signal is provided to adder 124 and then to amplifier 126 which sets the tracking bandwidth through the integration parameter $\beta$. Typically, these values may be adjusted by the system user or preset using a microprocessor in a manner known to one of ordinary skill. Circuit elements 124, 126 and 128 as described above form a lossy integrator. The output of the lossy integrator is provided to adder 128 and subsequently to select bits elements 170, which functions as described previously. Adder 128 may be initialized to symbol timing if a separate symbol timing acquisition algorithm is used. The above described normalization extends the dynamic range indefinitely while maintaining the same acquisition time and tracking bandwidth. This assumes that the signal to noise ratio is sufficiently high and that finite precision arithmetic is properly handled.

In the demodulator symbol tracking loop of the FIG. 1 embodiment however, when the signal temporarily dips below an unacceptable signal to noise ratio due to Rician or Rayleigh fading or blocking, it is desirable to suppress the loop feedback to allow the symbol timing to "flywheel" through the fades. This fading mitigation technique is implemented by adding a constant term $E_b$ (flywheel) $/N_0$ to the normalization denominator. The constant term is added at adder 114. Even when the flywheel knee is not added ($E_b$ (flywheel)=0), there is an effective 6 db knee at −3 db $E_b/N_0$ (effective 3 db knee is at 4.66 db $E_b/N_0$) because of the noise squared terms output from the non-linearities 106, which can be represented as $2(\sigma_{noise})^2$. The normalization accomplished in element 120 can be expressed as follows:

$$x(n) \equiv \frac{|h_{early}(n)|^2 - |h_{late}(n)|^2}{|h_{early}(n)|^2 + |h_{late}(n)|^2 + E_b \text{(flywheel)}/N_0} \quad (3)$$

In operation, the constant term $E_b$(flywheel)$/N_0$ sets the flywheel knee so that when an input signal level below the threshold level $E_b$(flywheel)$/N_0$ is applied to the demodulator symbol tracking loop, a corresponding error signal is provided from diff/sum normalizer 120 which enables the demodulator symbol tracking loop to "flywheel" through the fade so that the loop does not react to the noise. In other words, adding the constant $E_b$(flywheel)$/N_0$ to the denominator enables the error signal output from the diff/sum normalizer 120 to effectively diminish when the input signal level falls below the threshold level. The reaction of the demodulator symbol tracking loop to noise is suppressed so that symbol synchronization cannot be further adversely affected in the presence of a fade.

The flywheel knee should be scaled such that it has the effect of reducing the symbol tracking loop gain at $E_b N_0$ values less than the useful range (i.e., due to excessive bit error rate). Since $\sigma^2_{est}$ estimate of the noise, multiplying $\sigma^2_{est}$ by a factor NOISESCALE would increase the default knee by $20 \cdot \log(1+\text{NOISESCALE}/2)$dB relative to the −3dB $E_b N_0$ without scaling. The loop gain at the knee is reduced about ½ (6 dB) from the gain at high signal to noise ratio.

The output of the second integrator 128 is:

$$y(n) \equiv \alpha \sum_{k=0}^{n} \sum_{i=o}^{k} \beta^k x(i) \quad (4)$$

wherein the gain constant is $\alpha$ and one of the integration constants is $\beta$. In some implementations, $\alpha$ and $\beta$ are system parameters that can be set by the user. The integrator constant for integrator 128 is assumed to be unity. Since the typical useful dynamic range of y(n) can be high, and since the interpolation range is the number of virtual interpolation samples over one symbol period (e.g., 64) and is typically much smaller than the dynamic range, then it proves beneficial to use a larger number of bits to handle the dynamic range of y(n) and to use the required number of msb's of y(n) for interpolation control.

The discrete time transfer function of the entire tracking closed loop under high signal conditions can be expressed as:

$$H(z) \equiv \frac{c\alpha z^2}{(z-1)(z-\beta) + c\alpha z^2} \quad (5)$$

wherein c is a constant derived from the timing error signal after normalization over the piecewise linear region near the optimum symbol timing.

Figure 7:
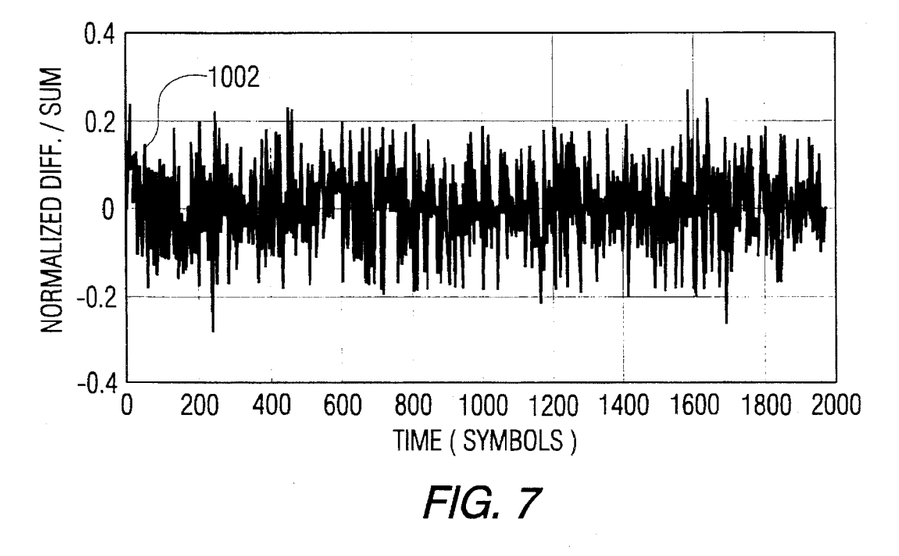
FIG. 7 illustrates an example of an output of the diff/sum normalizer of the FIG. 1 embodiment.
Figure 8:
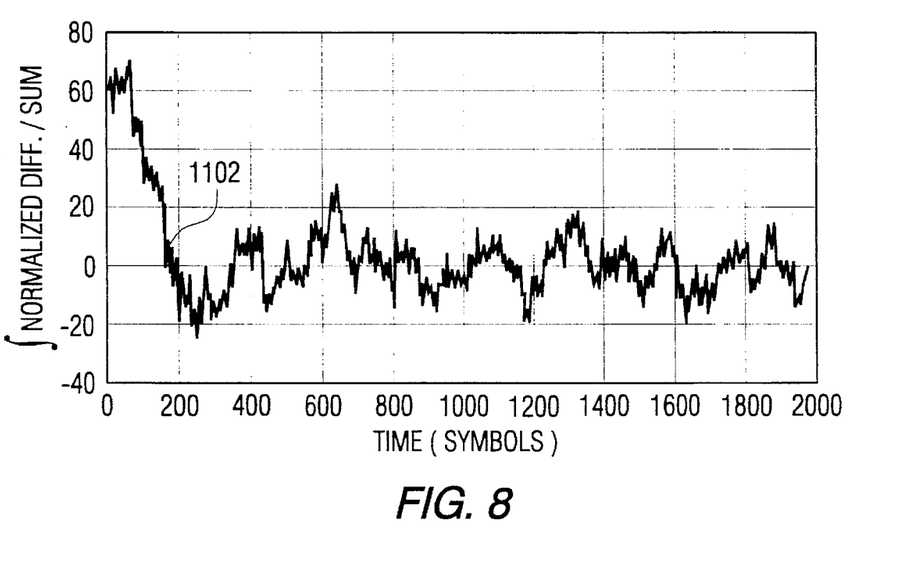
FIG. 8 illustrates an example of an input to adder 128 of the FIG. 1 embodiment.
Figure 9:
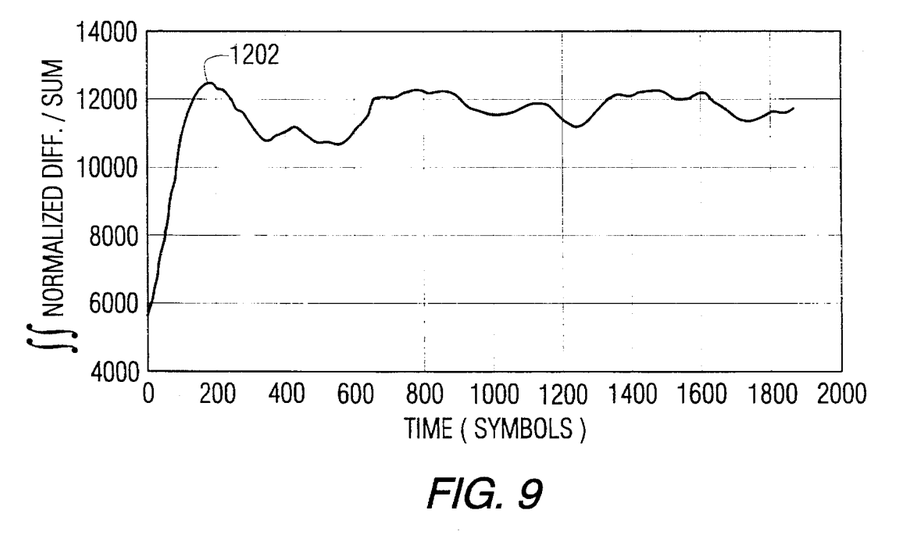
FIG. 9 illustrates an example of an input to block 170 of the FIG. 1 embodiment.
Figure 10:
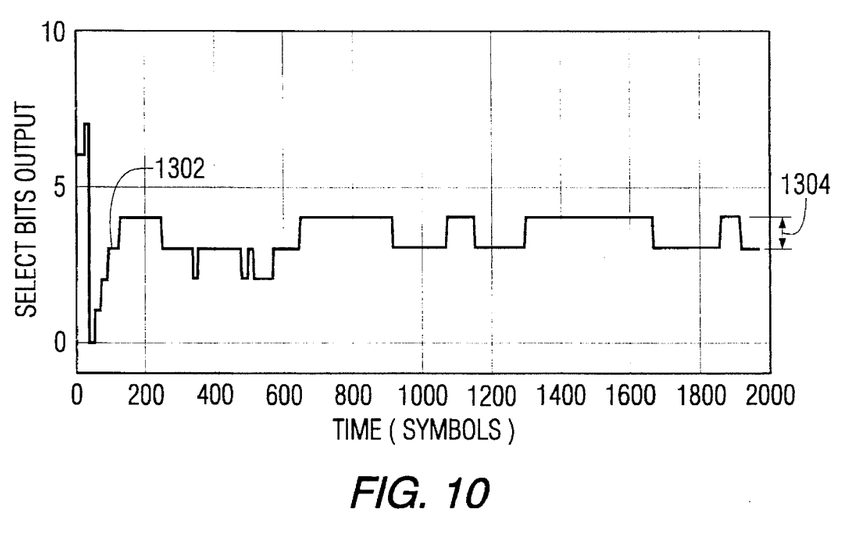
FIG. 10 illustrates an example of an interpolation control signal dithering over a given range.

Some examples of plots representative of performance of the symbol synchronizer 140 of FIG. 1 are shown in FIGS. 7–10. FIG. 7 is an example of a graph of the output of diff/sum normalizer 120. In FIG. 7, an initial small bias occurs prior to point 1002 because the filters are not completely centered on the symbol yet. FIG. 8 is an example of a graph of the output of adder 122. In FIG. 8, symbol synchronization is achieved at approximately point 1102. FIG. 9 is an example of a graph of the output of adder 128. FIG. 10 is an example of a graph of an interpolation control signal 172. In FIG. 10, interpolation control signal 172 dithers over range 1304 between two output values in an effort to keep the filters synchronized with the input signal. FIGS. 7–10 relate to a near worst case example, where the nominal signal to noise ratio is 6 dB (Eb/No), and includes Rician fading (K=10 dB, 200 Hz BW) and other channel impairments. The plots show that even under these severe conditions, the symbol tracking resulted in a symbol tracking error of less than 1% rms.

A drawback of the above described demodulator symbol tracking loop of the FIG. 1 embodiment is that the noise floor must be known in advance so that the constant term $E_b$(flywheel)/$N_0$ can be determined and added to the sum denominator during normalization. However, an absolute power level for the thermal noise floor cannot always be established with high accuracy since the gain of the receiver's analog front end can vary substantially due to component tolerances and temperature. The loop gain and reacquisition times of the symbol tracking loop are sensitive to the input signal level. In the front end components of the receiver, the gain can vary. Ideally, the gain of the front end receiver components should vary only within about ±1 dB accuracy. In order to overcome this characteristic of the FIG. 1 embodiment, the gain of the RF analog front end receiver components can be calibrated or designed to be more sophisticated and thus more expensive. However, this solution is not cost effective or particularly practical.

For the above reasons, it is desirable to monitor the level of the noise floor to be used to set the flywheel threshold. The automatic noise normalization of a preferred embodiment of the present invention as described hereinafter is a feature that allows the demodulator to operate with an unknown or varying front end gain or noise level. In this embodiment of the invention, the noise floor does not have to be known in advance. The automatic noise normalization of this embodiment includes estimation of a noise variance, which may then be followed by a filtering process. The constant term $E_b$(flywheel)/$N_0$ which sets the flywheel threshold in the symbol tracking loop of the FIG. 1 embodiment is replaced with the noise variance estimate. As noted above, the purpose of replacing the constant with a variable is to allow the absolute noise level to be unknown.

After initial acquisition, the noise variance is estimated using the following approximating technique.

Define $$X_k \equiv (I_{punctual,k})^2 + (Q_{punctual,k})^2 \quad (6)$$

wherein $x_k$ is defined as a function of the kth symbol of the matched filter output. It can be shown that the mean of the variable $x_k$ is $$\overline{x_k} = 2d^2 + 2\phi^2 \quad (7)$$

wherein d is the voltage of either the inphase or the quadrature signal component of a properly synchronized matched filter output sample and $\sigma^2$ is the corresponding noise variance of either the inphase or the quadrature noise component. Next, the following is defined:

$$\overline{(x_k - x_{k-1})^2} = 16\, d^2\sigma^2 + 8\sigma^4 \quad (8)$$

A practical infinite impulse response (IIR) filter to estimate the mean (time averages) in the above expressions has the form $$\overline{x_k} \equiv (1-\alpha)\overline{x_{k-1}} + \alpha x_k \quad (9)$$

wherein $\alpha$ represents a time constant of $1/\alpha$ symbols. The quotient of the two averages as indicated in equations (8) and (9) above can be used to estimate the noise variance at the matched filter outputs as follows:

$$\sigma_{est}^2 = \frac{\overline{(x_k - x_{k-1})^2}}{8\overline{x_k}} = \sigma^2 \left[ \frac{1}{2} + \frac{d^2}{2(d^2 + \sigma^2)} \right]. \quad (10)$$

This noise variance estimate is accurate for high signal to noise ratio, for example greater than 3 dB $E_b/N_0$. For low signal to noise ratio, the noise variance estimate approaches half the high signal to noise ratio value:

$$\lim_{SNR \to \infty} \sigma_{est}^2 = \sigma^2 \quad (11)$$

$$\lim_{SNR \to 0} \sigma_{est}^2 = \frac{1}{2} \sigma^2. \quad (12)$$

Simulations have shown that the reduced noise variance estimate for low signal to noise ratio has not appeared to hinder the effectiveness of the flywheel effect below the knee. In fact this effect has been shown to slightly improve reacquisition performance.

The demodulator symbol tracking loop of a preferred embodiment of the present invention which estimates a noise variance which is added to the normalization sum denominator as generally described above, will now be described in detail with reference to FIG. 11. It is to be understood that FIG. 11 includes the symbol tracking loop described previously with respect to FIG. 1. The description of the circuit elements of the symbol tracking loop which have been described in connection with FIG. 1 are omitted here for brevity.

The noise floor estimator 200 includes nonlinearities 202, such as squarers for example, which are respectively coupled to the punctual inphase and punctual quadrature matched filter outputs. The outputs of the respective nonlinearities 202 are provided to adder 204 which outputs the variable $x_k$ of equation (6). The output $x_k$ is provided to amplifier 206 which as configured with adder 208 and amplifier 210 comprises an IIR filter or lossy integrator which outputs B as the mean of $x_k$, or $\overline{x_k}$ as defined by equation (9).

The output $x_k$ of adder 204 is also provided to delay element 212 which provides a delay of one symbol period. Difference element 214 subsequently subtracts the output $x_{k-1}$ of delay element 212 from the output $x_k$ of adder 204. The output of difference element 214 is provided to squarer 216. The output of squarer element 216 is provided to amplifier 218 which along with adder 220 and amplifier 222 functions as an IIR filter or lossy integrator to provide output A, which is the mean of $(X_k - X_{k-1})^2$ as defined by equation (8). Divider element 224 outputs the quotient of the two averages represented by equations (8) and (9) to provide as an output C a noise variance estimate of the matched filter output as represented by equation (10).

The quotient of the noise variance estimate output from divider 224 reaches a nominal value much faster than the time constants of either the filtered numerator or denominator values. The reason is that the transient responses starting from a (near) zero condition are similar. Since the squared signal output from squarer 216 has a noisier or jumpier characteristic and has wider band due to squaring than $x_k$ which is output adder 204 to amplifier 206, the numerator value A is filtered with a different time constant than the denominator value B. If the same filters were applied to both the numerator and denominator values, then the quotient would firstly tend to overshoot its nominal value before settling to the nominal value roughly an order of magnitude faster than the time constants used in the corresponding numerator and denominator circuit elements. This overshoot is prevented by setting the filter time constants for the denominator circuit elements to about half of that of the time constants for the numerator circuit elements. This does not significantly effect the noisiness of the noise variance estimate since the denominator is already less noisy than the numerator.

The output of divider 224 may be directly output as the noise variance estimate to adder 114 of symbol synchronization estimator 150. The output C of dividing element 224 is however a nonprecise estimate of the noise. For example, when a modulated signal having a signal to noise ratio greater than 0 dB is present at the matched filter and when the symbol timing is inaccurate, such as during acquisition, the noise variance estimate appears very high. This is because the sampled signal output the unsynchronized matched filter appears similar to noise. When a subsequently produced high noise variance estimate is used in the flywheel knee, the loop tracking gain is reduced and the symbol acquisition time is increased. This consequence can be prevented by filtering the noise variance estimate as described hereinafter.

The noise variance estimate is erroneously high only for relatively short durations while the symbol timing is acquiring. At all other times the estimate is at its normal value while tracking, or approaches half its value while flywheeling. Although conventional linear filtering with an IIR filter can be used to mitigate this problem, the time constant of the linear filter should be significantly larger than the duration of the symbol acquisition time. This resulting large time constant would make the estimate sluggish. This sluggishness can be alleviated by a simple nonlinear filtering technique which can be described as slow attack, fast decay filtering. The only modification to the linear IIR filter would be to employ a slower time constant when the input sample to the filter (multiplied by its DC gain, if not already unity) is greater than the previous output sample of the filter. The IIR filter parameter $\alpha$ is inversely proportional to the time constant. The slow value for $\alpha$ should be set to a value significantly smaller than the reciprocal of the duration of the symbol acquisition in symbols.

Figure 11:
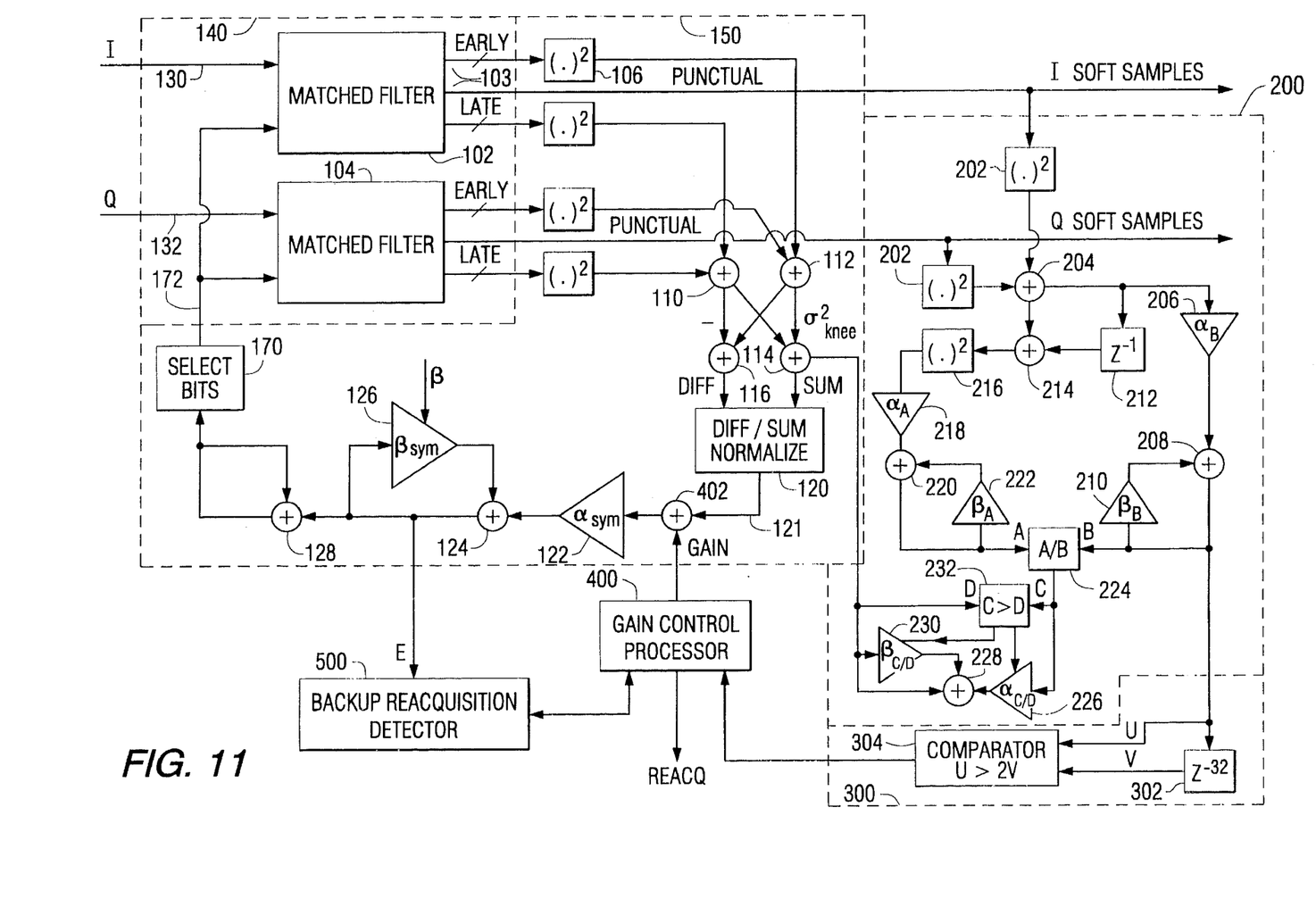
FIG. 11 illustrates a symbol tracking loop of a preferred embodiment of the present invention.

The nonlinear slow attack, fast decay filtering is provided by the circuit elements in FIG. 11 subsequent divider 224. As noted above, it is to be understood that the slow attack, fast decay filtering described hereinafter in greater detail is considered a supplemental feature for improving the noise floor estimator 220. The output C of divider 224 can be used directly as the noise variance estimate.

As illustrated in FIG. 11, the output C of divider 224, which can be represented as $\sigma_{est}^2$ in this particular embodiment, is provided to amplifier 226, which along with adder 228 and amplifier 230 functions as a lossy integrator. The output D of the lossy integrator is provided to decision element 232 which determines if the output C of divider 224 is greater than the output D of the lossy integrator. Decision element 232 may comprise a comparator or a processor for example. If the output C of the divider 224 is greater than the output D of the lossy integrator, decision element 232 determines that the symbol tracking loop is in an attack mode. Decision element 232 thereafter provides an output to amplifiers 226 and 230 to appropriately select the slower time constants $\alpha_c$ and $\beta_c$. When the output C of divider 224 is less than the output D of the lossy integrator, decision element 232 determines that the symbol tracking loop is in a decay mode and provides an output to amplifiers 226 and 230 to appropriately select the faster time constants $\alpha_D$ and $\beta_D$.

In the above described embodiment, the noise variance estimate for low signal to noise ratio is estimated to be half of the corresponding noise variance estimate for high signal to noise ratio. This feature temporarily provides an artificially low estimate of the noise variance when the signal input to the matched filter has faded, so that the threshold for the symbol tracking loop is more sensitive when the receiver comes out of the fade. The value $\sigma_{knee}^2$ provided to adder 114 in this particular descriptive embodiment can be summarized as follows:

$$\sigma_{knee,k}^2 \equiv \begin{bmatrix} (1-\alpha)\sigma_{knee,k-1}^2 + \alpha\sigma_{est,k}^2; \sigma_{est,k}^2 \leq \sigma_{knee,k-1}^2 \\ (1-\alpha_{slow})\sigma_{knee,k-1}^2 + \alpha_{slow}\sigma_{est,k}^2; \sigma_{est,k}^2 > \sigma_{knee,k-1}^2 \end{bmatrix}. \tag{13}$$

The demodulator symbol tracking loop of the FIG. 11 embodiment also includes a reacquisition control system which improves symbol reacquisition time in an intermittent or fading channel and which provides a reacquisition output signal which can be used to initiate other reacquisition features in other peripheral components, such as carrier reacquisition which is not illustrated here. Signal fades of sufficient duration can result in symbol timing or carrier tracking errors. Although the tracking loops will automatically reacquire, proper detection of reacquisition conditions, reacquisition here also including acquisition without a preamble, and subsequent action on the tracking loops can significantly improve the reacquisition times. In this embodiment of the present invention, upon determination of a symbol timing reacquisition condition, the reacquisition control system increases the symbol tracking loop gain for a specified reacquisition duration. The reacquisition control is described as follows.

Reacquisition detector 300 of FIG. 11 is coupled to the $\overline{x_k}$ output B of the lossy integrator of the noise floor estimator 200 which comprises amplifiers 206 and 210 and adder 208. The reacquisition detector 300 detects an abrupt increase in the signal level based upon the $\overline{x_k}$ output B of the lossy integrator. The abrupt increase in signal level is interpreted by the reacquisition detector 300 as indicative of recovery from a fade condition requiring reacquisition.

Ideally, the symbol tracking loop flywheels during a fade condition when the signal to noise ratio of the input signal falls below a predetermined level. Upon recovery of the fade condition and transition from a flywheel condition to a tracking condition, the reacquisition control system temporarily boosts the loop gain to enable the symbol tracking loop to acquire tracking as quickly as possible. On the other hand, during normal tracking a lower loop gain is maintained in order to prevent amplification of noise.

Reacquisition detector 300 includes delay 302 which delays the $\overline{x_k}$ output B from adder 208 of the lossy integrator by 32 symbol periods. Comparator 304, which is coupled to delay 302, subsequently compares $\overline{x_k}$ denoted as U with the output of delay 302 denoted as V. When comparator 304 determines that $\overline{x_k}$ is greater than twice the output of delay 302, or when U>2V, comparator 304 declares a reacquisition mode and outputs a reacquisition signal to gain control processor 400. It is to be understood that the 32 symbol period delay provided by delay 302 has been chosen in this particular embodiment since it is most likely that upon recovery from a fade condition, the signal level will abruptly double most certainly within 32 symbol periods. It is to be further understood that the reacquisition detector of the demodulator symbol tracking loop of the present invention is not limited to use of a 32 symbol period delay and that other symbol period delays may be used for diverse receivers or modem types depending on desired performance and conditions.

Upon receipt of the reacquisition signal, gain control processor 400 sets a reacquisition counter value REACQ COUNT=32, which corresponds in number to the symbol period delay, and subsequently declares REACQ=1, which directs entry of the reacquisition mode upon recovery of a fade condition. Gain control processor 400 decrements REACQ COUNT each subsequent symbol period. It is to be understood that a period clock provides demodulator symbol tracking loop timing in a known manner and is not shown in order to simplify FIG. 11. When REACQ=1, gain control processor 400 sets the loop gain of gain multiplier 402 which is coupled intermediate diff/sum normalizer 120 and amplifier 122 to GAIN=4 in order to enable the symbol tracking loop to acquire quickly. As the reacquisition count is eventually decremented to REACQ COUNT=0, gain control processor 400 sets REACQ=0. When REACQ=0, gain control processor 400 sets the loop gain of gain multiplier 402 to GAIN=1 to enable tracking with normal gain. In the manner described above through the use of REACQ COUNT, the duration of increased gain can be selected. It is to be understood that REACQ COUNT is not necessarily limited to being originally set to a count value equivalent to the delay symbol period and that various reacquisition mode durations can be selected as required. It is also to be understood that the value GAIN when REACQ=1 is not limited to GAIN=4 and that various values for GAIN when REACQ=1 can be appropriately chosen.

The demodulator symbol tracking loop of the FIG. 11 embodiment also includes backup reacquisition detector 500 which is described as follows. A reacquisition mode is also declared when the error signal in the symbol tracking loop becomes exceedingly large. This is detected when the error signal output from the adder 124 of first lossy integrator comprising amplifiers 122 and 126 and adder 124 exceeds a predetermined threshold. In other words, if for whatever reason it is determined that the symbol tracking error within the loop is too great and symbol timing is off by a corresponding large degree, a reacquisition mode is declared by backup reacquisition detector 500 as follows.

As noted, backup reacquisition detector 500 is coupled to the output of adder 124 of the first lossy integrator of the symbol tracking loop. If the error signal exceeds a predetermined high error threshold and if REACQ=0 which is indicative that the symbol tracking loop is not currently in a reacquisition mode, backup reacquisition detector 500 declares a reacquisition mode and outputs a reacquisition signal to gain control processor 400. Thereafter, gain control processor 400 resets REACQ COUNT=32 and REACQ=1. The loop gain of gain multiplier 402 is then set to GAIN=4. On the other hand, if it is determined that the error signal is less than a predetermined low error threshold and that REACQ=0, which is indicative that the symbol tracking loop is not currently in a reacquisition mode, a reacquisition mode is not declared by backup reacquisition detector 500 and REACQ=0 is maintained.

The backup reacquisition detector 500 is provided to initiate reacquisition when an exceedingly large error signal is produced within the symbol tracking loop even though abrupt increase in signal level indicative of recovery from a fade condition has not been detected. It is to be understood that the predetermined high and low error thresholds can be selected for the particular receiver or modem used in accordance with desired performance and conditions. It is to be further understood that backup reacquisition detector 500 may comprise a comparator or processor as readily evident to one of ordinary skill.

In the case of reacquisition as declared by either reacquisition detector 300 or backup reacquisition detector 500, the reacquisition condition is held for a duration of symbol periods as selected or until the symbol tracking loop error signal reaches a sufficiently low threshold level, whichever occurs last. As noted above, the duration of reacquisition and the symbol period delay are not limited to 32 symbol periods but may be selected as desired. For example, reacquisition may be maintained for a range of 32 to 50 symbol periods dependent upon receiver or modem type. Also, the REACQ signal may be provided as an output of gain control processor 400 to other peripheral circuits or functions to initiate other reacquisition features.

It is to be further understood that the invention as described above may be varied in many ways. For instance, the various circuit elements of the demodulator symbol tracking loop can be realized in a software implementation. Also, the circuit elements described can be replaced with various circuit elements which perform similar function. Such variations are not to be regarded as a departure from the spirit and scope of the invention, and all such modifications as would be obvious to one skilled in the art are intended to be included within the scope of the following claims.

What is claimed is:

1. A symbol tracking loop comprising:

symbol synchronization means, coupled to a modulated symbol waveform having a varying signal level, for sampling the modulated symbol waveform at an optimum sampling timing in accordance with an error signal and outputting symbol samples;

noise estimation means, coupled to said symbol synchronization means, for determining a noise variance estimate of the symbol samples and generating a noise variance signal indicative of the noise variance estimate; and synchronization estimation means, coupled to said symbol synchronization means, for determining if a sampling timing of said symbol synchronization means coincides with a symbol timing of the modulated symbol waveform based on the symbol samples and generating the error signal indicative thereof, said symbol synchronization means adjusting the sampling timing in accordance with the error signal, said synchronization estimation means being coupled to said noise estimation means to receive the noise variance signal and setting the error signal to a flywheel threshold relative to the noise variance estimate such that the symbol tracking loop flywheels when the signal level of the modulated symbol waveform falls below the flywheel threshold.

2. The symbol tracking loop of claim 1, wherein the modulated symbol waveform and the symbol samples include respective in-phase signal components and quadrature signal components, said noise estimation means comprising:

first squaring means for squaring the in-phase signal component and the quadrature signal component of the symbol samples and respectively outputting a squared in-phase signal component and a squared quadrature signal component;

first adder means, coupled to said first squaring means, for adding the squared in-phase signal component and the squared quadrature signal component and outputting a first added signal;

first filter means, coupled to said first adder means, for averaging the first added signal;

first delay means, coupled to said first adder means, for delaying the first added signal;

first subtracter means, coupled to said first delay means, for subtracting the delayed first added signal from the first added signal to output a first subtracted signal;

second squaring means, coupled to said first subtracter means, for squaring the first subtracted signal and outputting a first squared signal;

second filter means, coupled to said second squaring means, for averaging the first squared signal; and dividing means, coupled to said first and second filter means, for dividing the averaged first squared signal by the averaged first added signal to output the noise variance signal.

3. The symbol tracking loop of claim 2, wherein said first and second filter means comprise lossy integrators.

4. The symbol tracking loop of claim 3, wherein said first and second filter means have different time constants.

5. The symbol tracking loop of claim 4, wherein the time constant of said first filter means is substantially half the time constant of said second filter means.

6. The symbol tracking loop of claim 2, wherein said noise estimation means further comprises:

third filter means, coupled to said dividing means, for filtering the noise variance signal to provide a filtered noise variance signal, said third filter means operable in either of an attack mode or a decay mode; and determination means, coupled to said third filter means and said dividing means, for comparing the filtered noise variance signal with the noise variance signal and outputting a mode signal indicative thereof, said third filter means operable in the attack mode when the mode signal is indicative that the noise variance signal is greater than the filtered noise variance signal and in the decay mode when the mode signal is indicative that the noise variance signal is less than the filtered noise variance signal, the filtered noise variance signal being output to said synchronization estimation means as the noise variance signal.

7. The symbol tracking loop of claim 6, wherein said third filter means comprises a lossy integrator.

8. The symbol tracking loop of claim 7, wherein said lossy integrator operates using a first time constant during the attack mode and a second time constant during the decay mode, wherein the second time constant is faster than the first time constant.

9. The symbol tracking loop of claim 2, wherein said symbol synchronization means comprises a pair of matched filter means for converting the in-phase and quadrature signal components of the modulated symbol waveform respectively into the symbol samples having early, punctual and late in-phase signal components and early, punctual and late quadrature signal components.

10. The demodulator symbol tracking loop of claim 9, wherein said synchronization estimation means comprises:

rectification means, coupled to said symbol synchronization means, for performing a non-linear operation respectively on the early and late in-phase signal components and the early and late quadrature signal components to output rectified early and rectified late in-phase signal components and rectified early and rectified late quadrature signal components;

summing means, coupled to said rectification means, for a) summing the rectified early in-phase and the rectified early quadrature signal components to provide a second added signal, b) summing the rectified late in-phase and the rectified late quadrature signal components to provide a third added signal, c) adding the second added signal, the third added signal and the noise variance signal to output a sum signal and d) subtracting the third added signal from the second added signal to output a difference signal; and dividing means, coupled to said summing means, for dividing the difference signal by the sum signal to output the error signal.

11. The symbol tracking loop of claim 1, further comprising:

level detecting means, coupled to said symbol synchronization means, for determining an average signal level of the symbol samples and outputting an average level signal indicative thereof;

delay means, coupled to said level detecting means, for delaying the average level signal by a predetermined number of symbol periods and outputting a delayed level signal;

reacquisition determination means, coupled to said delay means, for comparing the delayed level signal and the average level signal and outputting a reacquisition signal if the average level signal is greater than twice the delayed level signal; and gain control means, coupled to said synchronization estimation means and said reacquisition determination means, for increasing a gain of the symbol tracking loop upon receipt of the reacquisition signal.

12. The symbol tracking loop of claim 11, wherein said gain control means comprises:

gain adjustment means, coupled to said synchronization estimation means, for establishing the gain of the symbol tracking loop in accordance with a gain control signal;

counter means, coupled to said reacquisition determination means, for setting a reacquisition count value to a predetermined count value upon receipt of the reacquisition signal and decrementing the reacquisition count value after each symbol period; and gain setting means, coupled to said counter means, for generating the gain control signal in accordance with the reacquisition count value to control the gain of the symbol tracking loop to be maintained at a nominal gain if the reacquisition count value is zero and at an increased gain greater than the nominal gain if the reacquisition count value is greater than zero.

13. The symbol tracking loop of claim 12, wherein said reacquisition determination means further compares the error signal to a predetermined error threshold and resets the reacquisition count value to the predetermined count value if the error signal is greater than the predetermined error threshold and the reacquisition count value is zero.

14. The symbol tracking loop of claim 12, wherein the increased gain is four times greater than the nominal gain.

15. The symbol tracking loop of claim 12, wherein the predetermined number of symbol periods is 32 and the predetermined count value is 32.

16. The symbol tracking loop of claim 11, wherein the modulated symbol waveform and the symbol samples include respective in-phase signal components and quadrature signal components, said level detecting means comprising:

first squaring means for squaring the in-phase signal component and the quadrature signal component of the symbol samples and respectively outputting a squared in-phase signal component and a squared quadrature signal component;

first adder means, coupled to said first squaring means, for adding the squared in-phase signal component and the squared quadrature signal component and outputting a first added signal; and first filter means, coupled to said first adder means, for averaging the first added signal to output the average level signal.

17. A symbol tracking loop comprising:

symbol synchronization means, coupled to a modulated symbol waveform having a varying signal level, for sampling the modulated symbol waveform at an optimum sampling timing in accordance with an error signal and outputting symbol samples;

synchronization estimation means, coupled to said symbol synchronization means, for determining if a sampling timing of said symbol synchronization means coincides with a symbol timing of the modulated symbol waveform based on the symbol samples and generating the error signal indicative thereof, said symbol synchronization means adjusting the sampling timing in accordance with the error signal;

level detecting means, coupled to said symbol synchronization means, for determining an average signal level of the symbol samples and outputting an average level signal indicative thereof;

delay means, coupled to said level detecting means, for delaying the average level signal by a predetermined number of symbol periods and outputting a delayed level signal;

reacquisition determination means, coupled to said delay means, for comparing the delayed level signal and the average level signal and outputting a reacquisition signal if the average level signal is greater than twice the delayed level signal; and gain control means, coupled to said synchronization estimation means and said reacquisition determination means, for increasing a gain of the symbol tracking loop upon receipt of the reacquisition signal.

18. The symbol tracking loop of claim 17, wherein said gain control means comprises:

gain adjustment means, coupled to said synchronization estimation means, for establishing the gain of the symbol tracking loop in accordance with a gain control signal;

counter means, coupled to said reacquisition determination means, for setting a reacquisition count value to a predetermined count value upon receipt of the reacquisition signal and decrementing the reacquisition count value after each symbol period; and gain setting means, coupled to said counter means, for generating the gain control signal in accordance with the reacquisition count value to control the gain of the symbol tracking loop to be maintained at a nominal gain if the reacquisition count value is zero and at an increased gain greater than the nominal gain if the reacquisition count value is greater than zero.

19. The symbol tracking loop of claim 18, wherein said reacquisition determination means further compares the error signal to a predetermined error threshold and resets the reacquisition count value to the predetermined count value if the error signal is greater than the predetermined error threshold and the reacquisition count value is zero.

20. The symbol tracking loop of claim 18, wherein the increased gain is four times greater than the nominal gain.

21. The symbol tracking loop of claim 18, wherein the predetermined number of symbol periods is 32 and the predetermined count value is 32.

22. The symbol tracking loop of claim 17, wherein the modulated symbol waveform and the symbol samples include respective in-phase signal components and quadrature signal components, said level detecting means comprising:

first squaring means for squaring the in-phase signal component and the quadrature signal component of the symbol samples and respectively outputting a squared in-phase signal component and a squared quadrature signal component;

first adder means, coupled to said first squaring means, for adding the squared in-phase signal component and the squared quadrature signal component and outputting a first added signal; and first filter means, coupled to said first adder means, for averaging the first added signal to output the average level signal.

23. A method of symbol tracking comprising:

(a) sampling a modulated symbol waveform at a sampling timing in accordance with an error signal to provide symbol samples, the modulated symbol waveform having a varying signal level;

(b) determining a noise variance estimate of the symbol samples and generating a noise variance signal indicative of the noise variance estimate; and (c) determining if the sampling timing in said step (a) coincides with a symbol timing of the modulated symbol waveform based on the symbol samples and generating the error signal indicative thereof, the sampling timing of said step (a) being adjusted in accordance with the error signal, said step (c) comprising setting the error signal to a flywheel threshold relative to the noise variance estimate such that the symbol tracking flywheels when the signal level of the modulated symbol waveform falls below the flywheel threshold.

24. A method of symbol tracking comprising:

(a) sampling a modulated symbol waveform at a sampling timing in accordance with an error signal to provide symbol samples, the modulated symbol waveform having a varying signal level;

(b) determining if a sampling timing in said step (a) coincides with a symbol timing of the modulated symbol waveform based on the symbol samples and generating the error signal indicative thereof, the sampling timing of said step (a) being adjusted in accordance with the error signal;

(c) determining an average signal level of the symbol samples to provide an average level signal indicative thereof;

(d) delaying the average level signal by a predetermined number of symbol periods to provide a delayed level signal;

(e) comparing the delayed level signal and the average level signal and providing a reacquisition signal if the average level signal is greater than twice the delayed level signal; and (f) increasing a symbol tracking gain upon provision of the reacquisition signal.

25. The method symbol tracking of claim 24, wherein said step (e) further comprises comparing the error signal to a predetermined error threshold and providing the reacquisition signal if the error signal is greater than the predetermined error threshold and the symbol tracking gain is not increased.

* * * * *